US012767238B2

(12) United States Patent
Cha et al.

(10) Patent No.: US 12,767,238 B2
(45) Date of Patent: Oct. 20, 2026

(54) BODY FOR VEHICLES

(71) Applicants: HYUNDAI MOTOR COMPANY, Seoul (KR); KIA CORPORATION, Seoul (KR)

(72) Inventors: Hyo Seop Cha, Seoul (KR); Seung Min Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 264 days.

(21) Appl. No.: 18/659,786

(22) Filed: May 9, 2024

(65) Prior Publication Data

US 2025/0242868 A1 Jul. 31, 2025

(30) Foreign Application Priority Data

Jan. 26, 2024 (KR) ........................ 10-2024-0012456

(51) Int. Cl.
*B62D 25/14* (2006.01)
*B62D 21/02* (2006.01)
*B62D 21/15* (2006.01)
*B62D 25/20* (2006.01)

(52) U.S. Cl.
CPC ........... *B62D 25/145* (2013.01); *B62D 21/02* (2013.01); *B62D 21/152* (2013.01); *B62D 25/20* (2013.01)

(58) Field of Classification Search
CPC ...... B62D 21/152; B62D 21/02; B62D 21/18; B62D 25/20; B62D 25/2009; B62D 25/2018; B62D 25/203; B62D 25/2045; B60R 21/045; B60R 2021/0004; B60R 2021/002; B60R 2021/0065; B60R 2021/0024
USPC ............. 296/70, 72, 63, 64, 65.302, 187.08, 296/193.07, 204, 187.05; 297/216.1, 297/216.13, 216.14
See application file for complete search history.

(56) References Cited

U.S. PATENT DOCUMENTS 3,964,578 A * 6/1976 Campbell ............. B60R 21/045 280/752
4,474,391 A * 10/1984 Matsuno ............... B60R 21/045 296/187.05
6,598,933 B2 7/2003 Taguchi
9,950,601 B2 * 4/2018 Mitani .................. B60L 15/007
11,225,289 B2 * 1/2022 Ogawa ................... B62D 21/02
12,083,937 B1 * 9/2024 Norton ................. B60N 2/4242
2003/0025358 A1 2/2003 Taguchi
2013/0277130 A1 * 10/2013 Katou .................. B62D 25/087 180/68.5

(Continued)

FOREIGN PATENT DOCUMENTS

JP 2003040142 A 2/2003
JP 2005206049 A 8/2005

(Continued)

*Primary Examiner* — Roger L Pang
(74) *Attorney, Agent, or Firm* — Lempia Summerfield Katz LLC

(57) ABSTRACT

A body for vehicles protects passengers by supporting seats through a cowl cross bar and a crush pad. The body includes a crash pad disposed to face a dash panel with a predetermined space therebetween in the vehicle. The body also includes a cowl cross bar connected in a transverse direction of the vehicle in the predetermined space and supported on the dash panel and the crash pad.

17 Claims, 7 Drawing Sheets

(56) References Cited

U.S. PATENT DOCUMENTS

| | | | |
|---|---|---|---|
| 2015/0035316 | A1 | 2/2015 | Kuriyama |
| 2022/0024353 | A1 | 1/2022 | Cha |
| 2022/0144148 | A1 | 5/2022 | Kim |

FOREIGN PATENT DOCUMENTS

| | | | |
|---|---|---|---|
| KR | 20180042635 | A | 4/2018 |
| KR | 20220163816 | A | 12/2022 |

* cited by examiner

BODY FOR VEHICLES

The present application claims priority to Korean Patent Application No. 10-2024-0012456, filed Jan. 26, 2024, the entire contents of which are incorporated herein for all purposes by this reference.

BACKGROUND

Technical Field

The present disclosure relates to a body for vehicles that protects passengers by supporting seats through a cowl cross bar and a crush pad.

Description of the Related Art

Purpose built vehicles (PBV) enable passengers to easily get into the PBV through a small step height and a flat floor.

In particular, in PBVs equipped with an autonomous driving system, it is possible not only to enable passengers to easily get into the PBVs, but also to secure a wide interior space by applying face-to-face seats.

When such face-to-face seats are applied, the front seats are arranged in a backward-facing state. The front seats are moved toward the dash panel to increase the facing distance, so the mounting of the front seats is positioned close to the dash panel.

Accordingly, when a front collision of a vehicle occurs, the airbags at the front part of the vehicle cannot be deployed, so backward-facing passengers may be injured when there is no sufficient safety means for the backward-facing passengers against rear impact.

The description provided above as related art of the present disclosure is to enhance understanding of the background of the present disclosure and should not be construed as being included in the related art known by those having ordinary skill in the art.

SUMMARY

An objective of the present disclosure is to provide a body for vehicles that protects passengers by supporting seats through a cowl cross bar and a crush pad.

A vehicle body of the present disclosure for achieving the objectives described above includes a crash pad disposed to face a dash panel of a vehicle with a predetermined space therebetween in the vehicle. The body also has a cowl cross bar connected in a transverse direction of the vehicle in the predetermined space and supported on the dash panel and the crash pad.

In a seat arrangement in which rear surfaces of seatbacks of seats in the vehicle face the crash pad, the cowl cross bar may be supported at portions of the crash pad to support the rear surfaces of the seatbacks.

A supporting bar may protrude from the cowl cross bar toward the dash panel and the supporting bar may be mounted at a plurality of positions on the dash panel. A supporting bracket may protrude from the cowl cross bar toward the crash pad and the supporting bracket may be mounted at a plurality of positions on the crash pad.

The supporting bar may include a plurality of supporting bars formed in a shape diverging up and down from the cowl cross bar and mounted on upper and lower portions of the dash panel, respectively. The supporting bracket may include a plurality of supporting brackets formed in or having a shape diverging up and down from the cowl cross bar and mounted at upper and lower portions of the crash pad, respectively.

A supporting portion may extend in a left-right, lateral, or transverse direction at ends of the supporting brackets. The supporting portion formed at an upper one of the supporting brackets may have a longer left-right length than the supporting portion formed at a lower one of the supporting brackets.

A reinforcing member may be coupled in a left-right direction to the dash panel. The cowl cross bar may be mounted on the reinforcing member.

Both ends of the reinforcing member and both ends of the cowl cross member may be mounted on left and right side panels of the vehicle.

An upper cross member may be transversely connected at an upper end of the dash panel. A tunnel cross member may be transversely connected under the upper cross member. The cowl cross bar may be mounted on the upper cross member and the tunnel cross member.

A center cross member may be transversely connected between the upper cross member and the tunnel cross member. A panel-reinforcing member may be connected lengthwise between the upper cross member and the center cross member.

A center cross member may be transversely connected between the upper cross member and the tunnel cross member. A seat mount member may be transversely connected to a portion extending to a floor at a lower end of the dash panel. A side cross member may be connected lengthwise between the center cross member and the seat mount member.

Side cross members may be disposed at left and right sides, respectively. The center cross member, the seat mount member, and the side cross members may be connected, thereby forming a rectangular reinforcing structure.

Seat side members may be connected between the side cross members and side panels of the vehicle. Seat mount brackets may be coupled to the seat side members.

The tunnel cross member may be connected over and across the side cross members.

Upper side members may be connected lengthwise between the tunnel cross member and the seat mount member.

The upper side members may be disposed at left and right sides, respectively. A lower reinforcing member may be transversely connected between the left and right upper side members.

A cowl panel may be connected toward a front and an upper end of the dash panel. An upper end and a lower end of the crash pad may be connected to the cowl panel and the dash panel, respectively.

According to the configuration described above, the present disclosure has the effect that, when a collision occurs, the cowl cross bar installed between the dash panel and the crash pad supports the crash pad. As a result, the configuration supports the front seats being in contact with the crash pad and prevents the front seats from falling forward, and thus, safely protects passengers.

Further, the present disclosure also has the advantage that the strength of the dash panel is secured by coupling several reinforcing members to the dash panel. Additionally, the coupling force of the cowl cross bar is secured by mounting the cowl cross bar on the reinforcing members.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
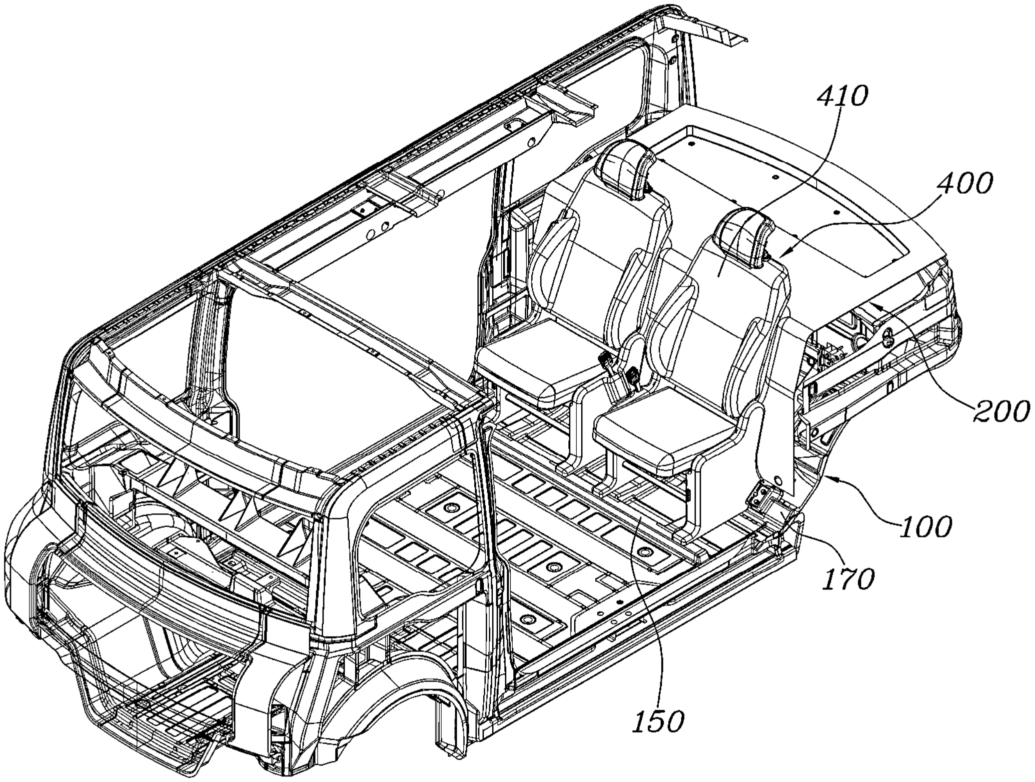
FIG. 1 is a view showing a structure with seats arranged in a backward-facing state in a purpose built vehicle in accordance with the present disclosure.
Figure 2:
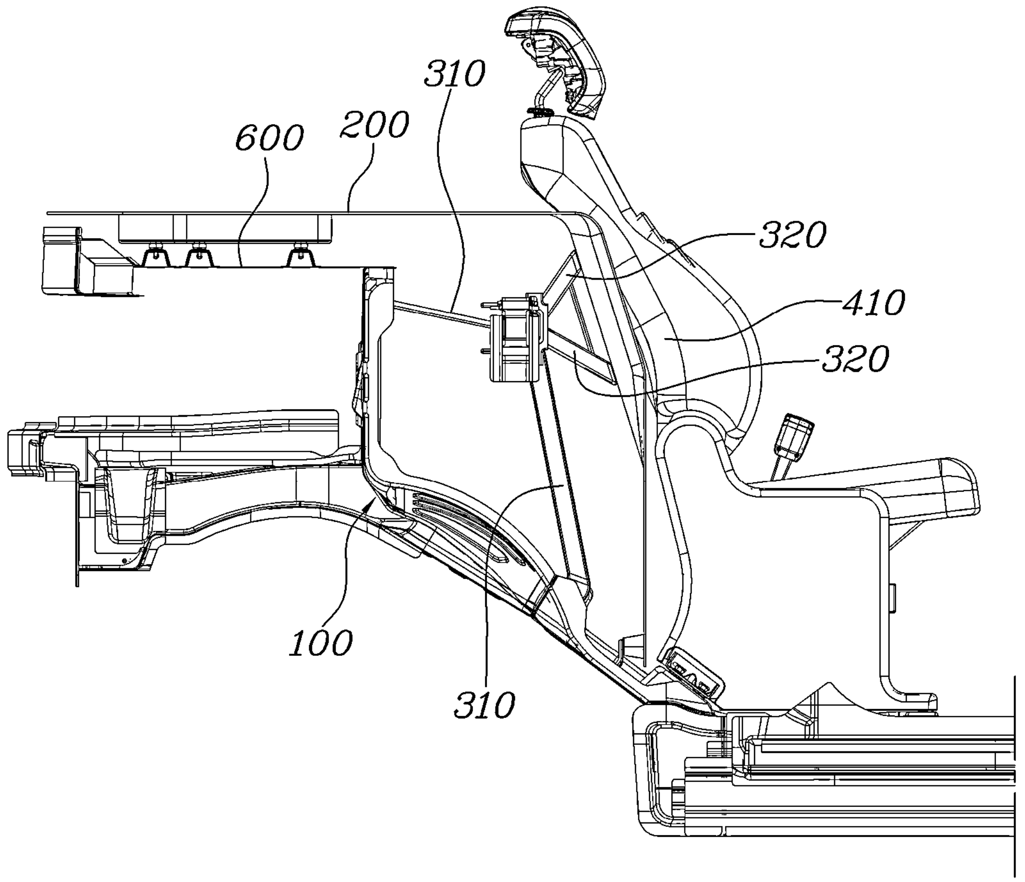
FIG. 2 is a view showing a side shape in which a cowl cross bar is connected between a dash panel and a crush pad in accordance with the present disclosure.

Embodiments of the present disclosure are described in detail with reference to the accompanying drawings. The same or similar components are given the same reference numerals throughout the drawing figures and such components are not repeatedly described.

The terms “module”, “member”, and “unit” that are used for components in the following description are used only for the convenience of description without having discriminate meanings or functions.

In the following description, where it has been decided that the detailed description of known technologies related to the present disclosure would have made the subject matter of the embodiments described herein unclear, the detailed description has been omitted. Further, the accompanying drawings are provided only to aid in understanding the embodiments disclosed in the specification. The technical spirit disclosed in the specification is not limited by the accompanying drawings. All changes, equivalents, and replacements should be understood as being included in the spirit and scope of the present disclosure.

Terms including ordinal numbers such as “first” and “second” may be used to describe various components, but the components are not to be construed as being limited by the terms. The terms are used only to distinguish one component from another component.

It is to be understood that, when one element is referred to as being “connected to” or “coupled to” another element, the one element may be connected directly to or coupled directly to the other element or may be connected to or coupled to the other element with another element therebetween. On the other hand, it should be understood that, when one element is referred to as being “connected directly to” or “coupled directly to” another element, the one element may be connected to or coupled to the other element without another element therebetween.

When a component, device, element, unit, member, or the like of the present disclosure is described as having a purpose or performing an operation, function, or the like, the component, device, element, member, or unit should be considered herein as being “configured to” meet that purpose or to perform that operation or function.

Singular forms are intended to include plural forms unless the context clearly indicates otherwise.

It should be further understood that the terms “comprise” or “have” and variations thereof used in this specification specify the presence of stated features, steps, operations, components, parts, or a combination thereof. However, such terms do not preclude the presence or addition of one or more other features, numerals, steps, operations, components, parts, or a combination thereof.

Embodiments of the present disclosure are described hereafter in detail with reference to the accompanying drawings.

A body for vehicles according to the present disclosure includes a crash pad 200 disposed within a predetermined space from the dash panel 100 in the vehicle. The body also includes a cowl cross bar 300 connected in the transverse direction of the vehicle in the predetermined space and supported on the dash panel 100 and the crash pad 200. The body may be for a variety of different types of vehicles.

Referring to FIGS. 1-4, front seats 400 and rear seats (not illustrated) are installed at the front and rear parts in the interior of the vehicle. The front seats 400 and the rear seats may be installed in a facing type configuration in which they face each other. Accordingly, passengers sitting in the front seats 400 sit in a backward-facing state in which they face the rear seats.

The crush pad 200 is installed behind the seatbacks 410 of the front seats 400 and is installed to face the dash panel 100.

In detail, the rear surfaces of the seatbacks 410 of the front seats 400 are in contact with the crash pad 200. As a result, the seats 400 are supported on the crash pad 200 and the crash pad 200 is installed a predetermined space from the dash panel 100.

Further, the cowl cross bar 300 is disposed in a left-right direction (i.e., widthwise, lateral, or side-to-side direction of the vehicle) in the space formed between the dash panel 100 and the crash pad 200. Additionally, both ends of the cowl cross bar 300 are mounted on side panels 500 of the vehicle. The side panels 500 may be panel members including the A-pillar panels or members installed on the side panels 500.

In particular, a portion of the cowl cross bar 300 protrudes toward the dash panel 100 and is mounted and supported on the dash panel 100. Additionally, another portion of the cowl cross bar 300 protrudes toward the crash pad 200 and is supported on the crash pad 200.

Accordingly, when a front collision of the vehicle occurs, the cowl cross bar 300 installed between the dash panel 100 and the crash pad 200 supports the crash pad 200, thereby supporting the front seats 400 being in contact with the crash pad 200.

Accordingly, the front seats 400 are prevented from falling forward, so passengers are safely protected.

Further, according to the present disclosure, in the seat arrangement in which the rear surfaces of the seatbacks 410 face the crash pad 200, the cowl cross bar 300 may be supported at the portions of the crash pad 200 for supporting the rear surfaces of the seats 400.

In other words, the protruding portions of the cowl cross bar 300 are supported on the crash pad 200 supporting the seatbacks 410. As a result, the seats 400 are more securely supported through the cowl cross bar 300.

The portions protruding from the cowl cross bar 300 are described in more detail with reference to FIGS. 4 and 7. A supporting bar 310 protrudes from the cowl cross bar 300 toward the dash panel 100. The supporting bar 310 may be mounted at a plurality of positions on the dash panel 100. A supporting bracket 320 protrudes from the cowl cross bar 300 toward the crash pad 200. The supporting bracket 320 may be mounted at a plurality of positions on the crash pad 200.

For example, a supporting bar 310 formed in a bar shape protrudes from the cowl cross bar 300 toward the dash panel

100. The end of the supporting bar 310 is mounted and supported at at least two or more positions on the dash panel 100. As a result, the cowl cross bar 300 is more stably supported on the dash panel 100.

Further, a supporting bracket 320 formed in a bracket shape protrudes from the cowl cross bar 300 toward the crash pad 200. The end of the supporting bracket 320 is mounted and supported at at least two or more positions on the crash pad 200. As a result, the cowl cross bar 300 is more stably supported on the crash pad 200.

Further, a plurality of supporting bars 310 may be formed in a shape diverging up and down from the cowl cross bar 300 and mounted on the upper and lower portions of the dash panel 100, respectively. Additionally, a plurality of supporting brackets 320 may be formed in a shape diverging up and down from the cowl cross bar 300 and mounted at the upper and lower portions of the crash pad 200, respectively.

For example, the upper section of the dash panel 100 is a plate vertically formed in the up-down direction and the lower section connected to the upper section is a plate formed to be inclined downward toward the lower ends of the seats 400.

Accordingly, two supporting bars 310 diverge up and down from the cowl cross bar 300. The supporting bar 310 diverging up is mounted on the upper section of the dash panel 100. The supporting bar 310 diverging down is mounted and supported on the lower section of the dash panel 100.

Further, a horizontal pad part 200*a* is formed in the front-rear direction (i.e., the lengthwise or longitudinal direction of the vehicle) on the upper end of the crash pad 200. A vertical pad part 200*b* is formed in a downwardly bent shape at the end of the horizontal pad part 200*a* close to the seats 400.

Accordingly, two supporting brackets 320 diverge up and down from the cowl cross bar 300. The supporting bracket 320 diverging up is mounted on the upper region of the vertical pad part 200*b*. The supporting bracket 320 diverging down is mounted and supported on the lower region of the vertical pad part 200*b*.

In this configuration, the structure having two diverging supporting bars 310 and the structure having two diverging supporting brackets 320 each may be symmetrically provided at the left and right on the cowl cross bar 300.

Further, a supporting portion 321 is formed to extend in the left-right direction at the ends of each supporting bracket 320 and supported on the crash pad 200. Additionally, the supporting portion 321 formed at the upper supporting bracket 320 may have a longer left-right length than the supporting portion 321 formed at the lower supporting bracket 320.

Figure 7:
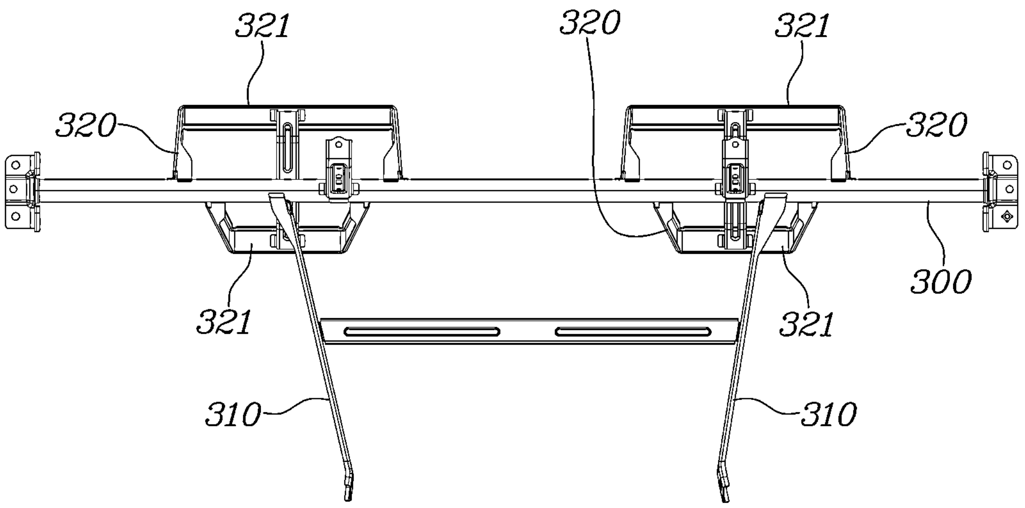
FIG. 7 is a view showing a cowl cross bar according to the present disclosure.

In other words, as shown in FIG. 7, each supporting bracket 320 is formed in a 'U' shape and a supporting portion 321 is formed in the left-right direction at the middle portion of the supporting bracket 320 and supported on the crash pad 200.

Accordingly, the supporting portions 321 of the two brackets 320 diverging up and down at one position are both supported on the crash pad 200. Particularly, the supporting portion 321 of the supporting bracket 320 diverging up of the two supporting brackets 320 is supported while having a longer left-right length than the supporting portion 321 of the supporting bracket 320 diverging down.

Figure 5:
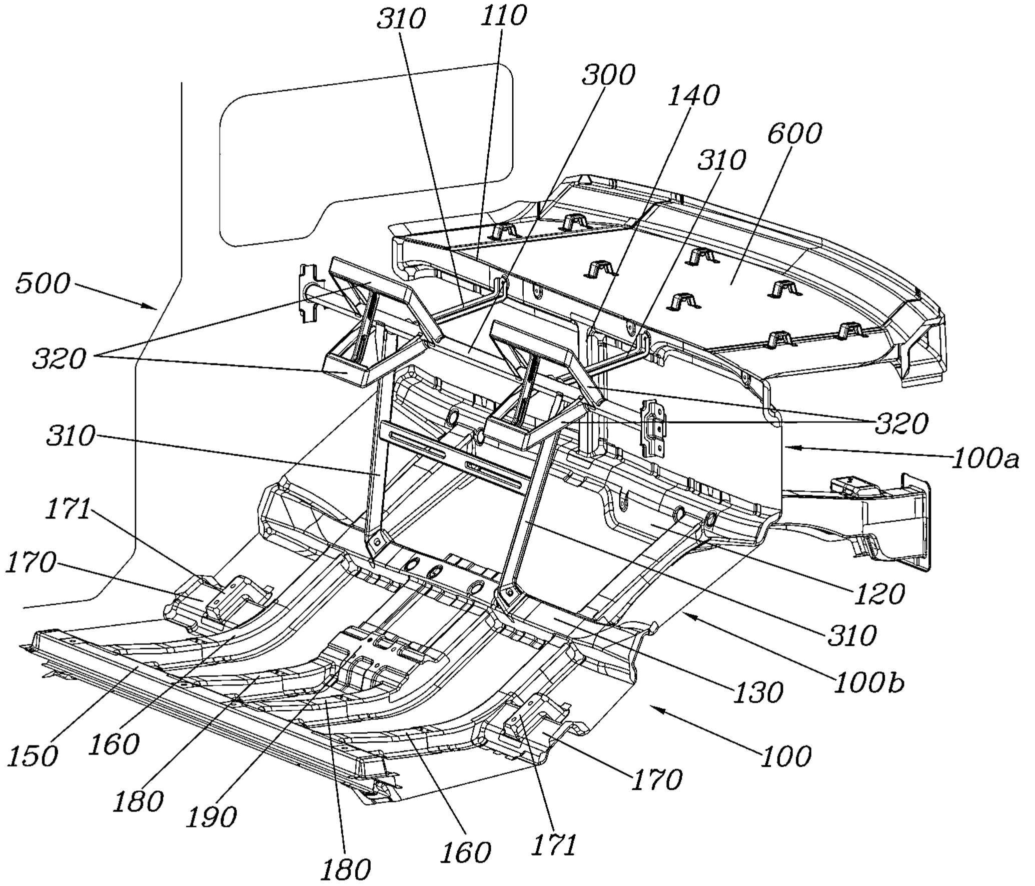
FIG. 5 is a view showing a state in which a cowl cross bar according to the present disclosure is connected to reinforcing members coupled to a dash panel.
Figure 6:
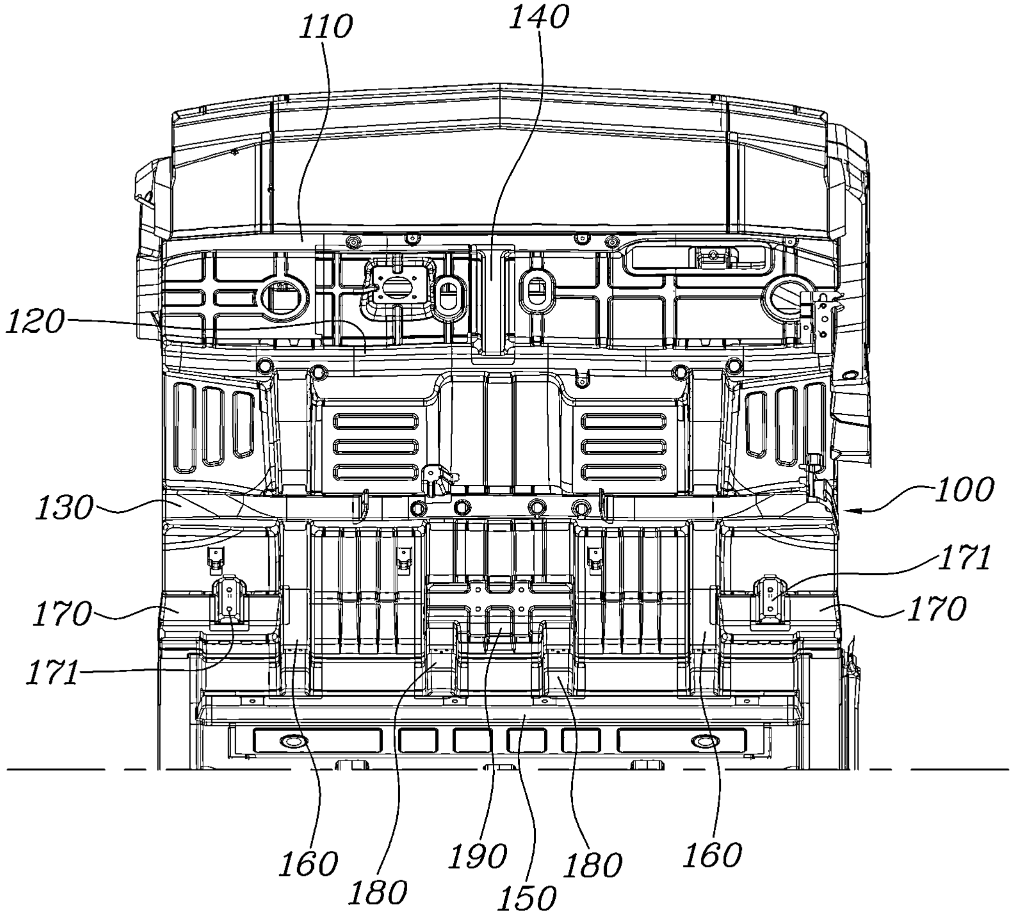
FIG. 6 is a view showing reinforcing members coupled to a dash panel according to the present disclosure.

As shown in FIGS. 5 and 6, according to the present disclosure, reinforcing members may be in a widthwise direction coupled to the dash panel 100 and the cowl cross bar 300 may be mounted on the reinforcing members.

With reference to the figures, several reinforcing members are coupled transversely and in a widthwise direction to the dash panel 100 facing the crash pad 200 and the supporting bars 310 are mounted on some of the reinforcing members. The reinforcing members may include an upper cross member 110, a center cross member 120, and a tunnel cross member 130, described below. The combination relationships thereof are described below.

In other words, in a vehicle that is applied with a body according to the present disclosure, the dash panel 100 is long because a low step height is applied. Additionally, a steering wheel, pedals, and the like are not applied to the dash panel 100, so several reinforcing members are coupled to reinforce the wide dash panel 100. As a result, the strength of the dash panel 100 is secured.

Further, since the supporting bars 310 are mounted on the reinforcing members 110, 120, and 130, the coupling force of the supporting bars 310 is improved.

Further, both ends of the reinforcing members 110, 120, and 130, and both ends of the cowl cross bar 300 may be mounted on the left and right sides panels 500 of the vehicle.

For example, the upper cross member 110, the center cross member 120, and the tunnel cross member 130 are installed and spaced apart from each other at the upper and lower portions of the dash panel 100 and are formed in the left-right direction. Additionally, both ends thereof are mounted on the side panels 500. The side panels 500 may be panel members including the A-pillar panels or members installed on the side panels 500.

Further, the upper cross member 110 may be transversely connected at the upper end of the dash panel 100 and the tunnel cross member 130 may be transversely connected under the upper cross member 110. Additionally, the cowl cross bar 300 may be mounted on the upper cross member 110 and the tunnel cross member 130.

Referring to FIGS. 5 and 6, the upper cross member 110 is connected left to right at the upper end of the upper section 100*a* of the dash panel 100 and the tunnel cross member 130 is connected left to right at the middle of the lower section 100*b* of the dash panel 100.

Accordingly, the supporting bars 310 diverging up from the cowl cross bar 300 are mounted on the upper cross member 110 and the supporting bars 310 diverging down are mounted on the tunnel cross member 130.

Therefore, the supporting bars 310 diverging up and down from the cowl cross bar 300 are mounted and supported at the upper portion and the lower portion of the dash panel 100, respectively. As a result, the cowl cross bar 300 can be stably coupled and supported.

Further, the center cross member 120 is transversely connected between the upper cross member 110 and the tunnel cross member 130. Additionally, a panel-reinforcing member 140 may be connected lengthwise between the upper cross member 110 and the center cross member 120.

Referring to FIGS. 5 and 6, the center cross member 120 is connected left to right at the bend between the upper section 100*a* and the lower section 100*b* of the dash panel 100.

Further, the panel-reinforcing member 140 is connected in the up-down direction between the center of the lower end of the upper cross member 110 and the center of the upper end of the center cross member 120. As a result, the panel-reinforcing member 140 reinforces the connection strength between members 110 and 120.

Further, the center cross member 120 may be transversely connected between the upper cross member 110 and the tunnel cross member 130 and a seat mount member 150 may be transversely connected to the portion extending to a floor at the lower end of the dash panel 100. Additionally, a side cross member 160 may be connected lengthwise between the center cross member 120 and the seat mount member 150. In this embodiment, there are multiple side cross members 160.

In this configuration, the portion extending to the floor may be formed by extending the dash panel 100 or may be a floor panel connected to the lower end of the dash panel 100.

Referring to FIGS. 1, 5, and 6, the seat mount member 150 is connected left to right and the lower ends of the front seats 400 are mounted on the seat mount member 150.

Further, the side cross members 160 are connected in the front-rear direction (i.e., the lengthwise or longitudinal direction of the vehicle) between the left and right sides of the lower end of the center cross member 120 and the left and right sides of the seat mount member 150. As a result, the side cross members 160 secure connection strength between members 120 and 150.

Further, the side cross members 160 are disposed, one each, at or closer toward each of the left and the right sides of the body. The center cross member 120, the seat mount member 150, and the cross side member 160 are connected, thereby forming a rectangular reinforcing structure.

In other words, as shown in FIG. 6, the center cross member 120 and the seat mount member 150 are formed in the left-right direction at the upper and lower portions of the dash panel 100, respectively. Additionally, the side cross members 160 are connected in the front-rear direction between the left and right sides of the center cross member 120 and the seat mount member 150. As a result, a rectangular reinforcing structure is implemented by the combination of these members.

Further, the center cross member 120 and the seat mount member 150 further extend from the joints with the side cross members 160 and are mounted on the side panels 500, so it may be considered that a 'Π'-shaped reinforcing structure is implemented by these members.

Accordingly, since a reinforcing structure is implemented by perpendicularly connecting several members, the connection strength of the members can be further improved.

Further, seat side members 170 may be connected between the side cross members 160, respectively, and the side panels 500 of the vehicle. Seat mount brackets 171 may be coupled to the seat side members 170.

Referring to FIGS. 1, 5, and 6, a left seat side member 170 is connected left to right between the lower end of a left side cross member 160 and a left side panel 500. A right seat side member 170 is connected left to right between the lower end of a right side cross member 160 and a right side panel 500.

Further, the seat mount brackets 171 are coupled over the left and right seat side members 170, respectively. The rear lower ends of the front seats 400 are mounted on the seat mount brackets 171.

Accordingly, the front seats 400 are stably mounted, so the coupling strength of the seats 400 is secured.

Further, the tunnel cross member 130 may be connected over and across the side cross members 160.

In other words, referring to FIGS. 5 and 6, the tunnel cross member 130 is coupled over and across the left and right side cross members 160 implementing the rectangular reinforcing structure or the 'Π'-shaped reinforcing structure. As a result, the connection structure of the tunnel cross member 130 is added to the reinforcing structure, so the connection strength between the members is further improved.

Further, upper side members 180 may be connected lengthwise between the tunnel cross member 130 and the seat mount member 150.

Referring to FIGS. 5 and 6, the upper side members 180 are connected in the front-rear direction between the left and right sides of the lower end of the tunnel cross member 130 and the left and right sides of the seat mount member 150. As a result, the upper side members 180 secure connection strength between members 130 and 150. In this configuration, the upper side members 180 may be connected at the left side and the right side, respectively, between the left and right side cross members 160.

Further, the upper side members 180 are provided at the left and the right, respectively, and a lower reinforcing member 190 may be transversely connected between the left and right upper side members 180.

In other words, the lower reinforcing member 190 may be connected in the left-right direction between the left and right upper side members 180. Additionally, the front seat may be mounted on the lower reinforcing member 190.

According to the present disclosure, a cowl panel 600 may be connected toward the front at the upper end of the dash panel 100. The upper end and the lower end of the crash pad 200 may be connected to the cowl panel 600 and the dash panel 100, respectively.

Figure 3:
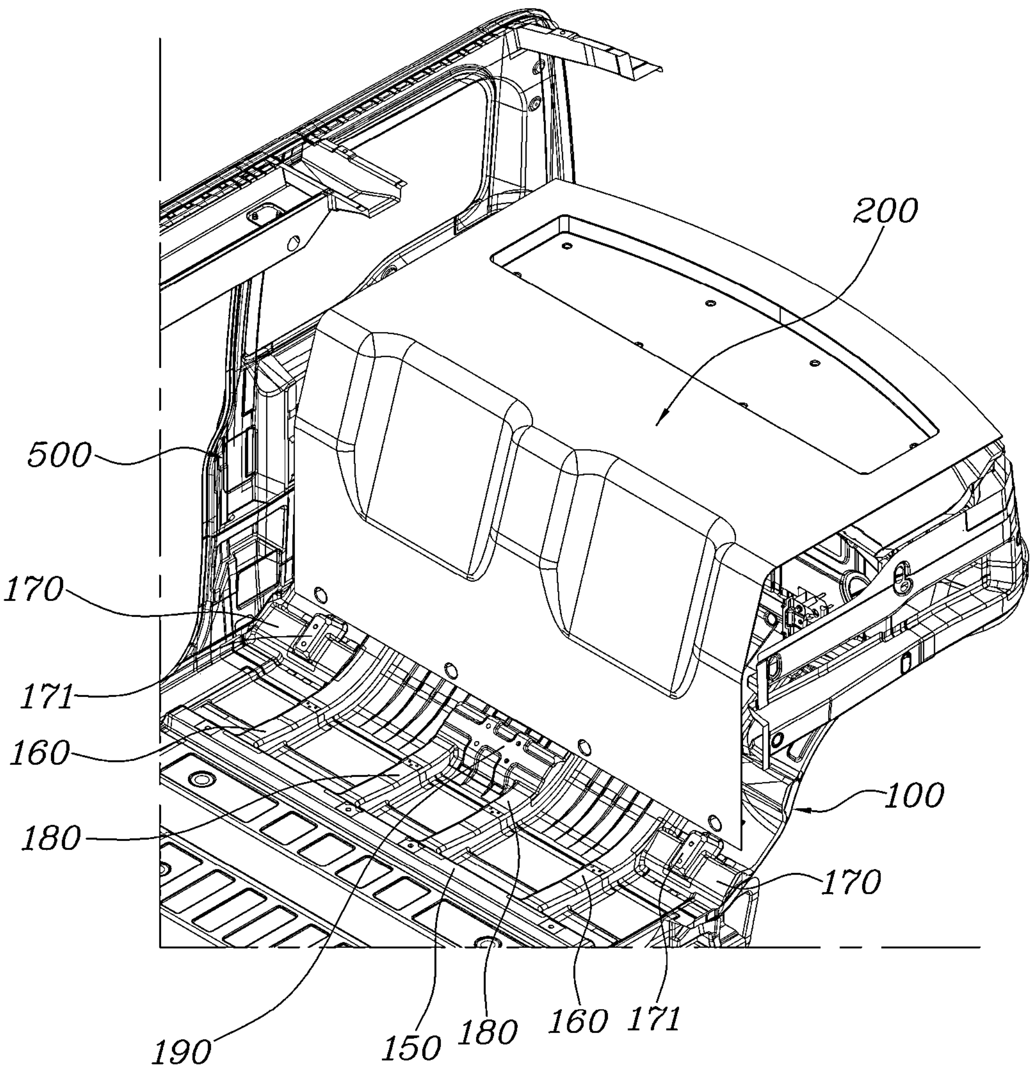
FIG. 3 is a view with the seats removed in FIG. 1.
Figure 4:
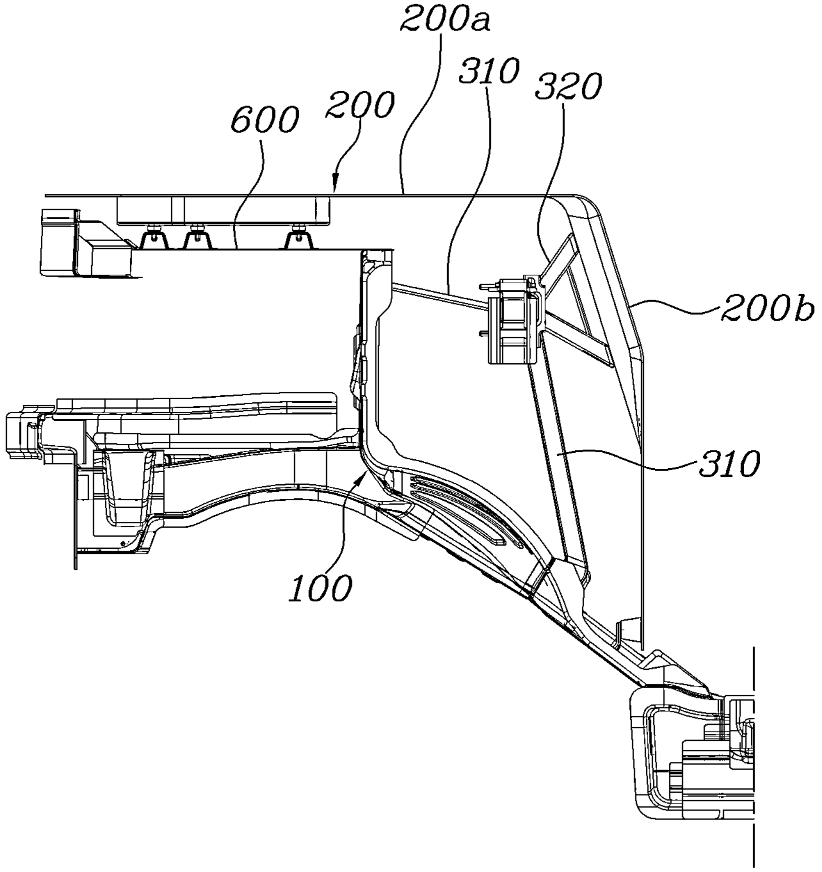
FIG. 4 is a view with the seat removed in FIG. 2.

Referring to FIGS. 3 and 4, the horizontal pad part **200*a* of the crash pad 200 is coupled to the cowl panel 600 in a shape covering the top of the cowl panel 600. The lower end of the vertical pad part 200*b* of the crash pad 200 is coupled to the lower end of the dash panel 100. For reference, the upper formation of the crash pad 200** is formed for an air-conditioning duct.

As described above, when a collision occurs, the cowl cross bar 300 installed between the dash panel 100 and the crash pad 200 supports the crash pad 200. As a result, the cowl cross bar supports the front seats 400 being in contact with the crash pad 200 and prevents the front seats 400 from falling forward, and thus, safely protecting passengers.

Further, the strength of the dash panel 100 is secured by coupling several reinforcing members to the dash panel 100 and the coupling force of the cowl cross bar 300 is secured by mounting the cowl cross bar 300 on the reinforcing members.

Although the present disclosure is described with reference to the detailed embodiments, it should be apparent to those having ordinary skill in the art that the present disclosure may be changed and modified in various ways without departing from the scope of the present disclosure. Additionally, it should be noted that the changes and modifications are included in claims.

What is claimed is:

1. A body for a vehicle, the body comprising:

a crash pad disposed to face a dash panel with a predetermined space therebetween in the vehicle; and a cowl cross bar connected in a transverse direction of the vehicle in the predetermined space and supported on the dash panel and the crash pad, wherein a supporting bar protrudes from the cowl cross bar toward the dash panel and is mounted at a plurality of positions on the dash panel, and wherein a supporting bracket protrudes from the cowl cross bar toward the crash pad and is mounted at a plurality of positions on the crash pad.

2. The body of claim 1, wherein, in a seat arrangement in which rear surfaces of seatbacks of seats face the crash pad, the cowl cross bar is supported at portions of the crash pad to support the rear surfaces of the seats.

3. The body of claim 1, wherein:
the supporting bar comprises a plurality of supporting bars formed in a shape diverging up and down from the cowl cross bar and mounted on upper and lower portions of the dash panel, respectively; and
the supporting bracket comprises a plurality of supporting brackets formed in a shape diverging up and down from the cowl cross bar and mounted at upper and lower portions of the crash pad, respectively.
4. The body of claim 3, wherein:
a supporting portion extends in a left-right direction at ends of each of the plurality of supporting brackets; and
the supporting portion formed at an upper supporting bracket of the plurality of supporting brackets has a longer left-right length than the supporting portion formed at a lower supporting bracket of the plurality of supporting brackets.
5. The body of claim 1, wherein:
a reinforcing member is coupled in a left-right direction to the dash panel; and
the cowl cross bar is mounted on the reinforcing member.
6. The body of claim 5, wherein both ends of the reinforcing member and both ends of the cowl cross member are mounted on left and right side panels of the vehicle.
7. The body of claim 5, wherein:
the reinforcing member includes an upper cross member, a center cross member, and a tunnel cross member; and
the upper cross member, the center cross member, and the tunnel cross member are installed and spaced apart from each other at upper and lower portions of the dash panel.
8. The body of claim 1, wherein:
an upper cross member is transversely connected at an upper end of the dash panel;
a tunnel cross member is transversely connected under the upper cross member; and
the supporting bar formed on the cowl cross member is mounted on each of the upper cross member and the tunnel cross member coupled to the dash panel, such that the cowl cross bar is supported on the dash panel.
9. The body of claim 8, wherein:
a center cross member is transversely connected between the upper cross member and the tunnel cross member; and
a panel-reinforcing member is connected lengthwise between the upper cross member and the center cross member.
10. The body of claim 8, wherein:
a center cross member is transversely connected between the upper cross member and the tunnel cross member;
a seat mount member is transversely connected to a portion extending to a floor at a lower end of the dash panel; and
side cross members are connected lengthwise between the center cross member and the seat mount member.
11. The body of claim 10, wherein:
the side cross members are disposed at left and right sides, respectively; and
the center cross member, the seat mount member, and the cross side members are connected, thereby forming a rectangular reinforcing structure.
12. The body of claim 10, wherein:
seat side members are connected between the side cross members and side panels of the vehicle; and
seat mount brackets are coupled to the seat side members.
13. The body of claim 10, wherein the tunnel cross member is connected over and across the side cross members.
14. The body of claim 10, wherein upper side members are connected lengthwise between the tunnel cross member and the seat mount member.
15. The body of claim 14, wherein:
the upper side members are disposed at left and right sides, respectively; and
a lower reinforcing member is transversely connected between the left and right upper side members.
16. The body of claim 1, wherein:
a cowl panel is connected toward a front and an upper end of the dash panel; and
an upper end and a lower end of the crash pad are connected to the cowl panel and the dash panel, respectively.
17. A body for a vehicle, the body comprising:
a dash panel;
a crash pad disposed to face the dash panel with a predetermined space therebetween in the vehicle;
a cowl cross bar connected in a transverse direction of the vehicle in the predetermined space and supported on the dash panel and the crash pad; and
a reinforcing member coupled in a left-right direction to the dash panel,
wherein the cowl cross bar is mounted on the reinforcing member,
wherein the reinforcing member includes an upper cross member, a center cross member, and a tunnel cross member, and
wherein the upper cross member, the center cross member, and the tunnel cross member are installed and spaced apart from each other at upper and lower portions of the dash panel.

* * * * *